US012647678B2

(12) United States Patent
Tam et al.

(10) Patent No.: US 12,647,678 B2
(45) Date of Patent:    Jun. 2, 2026

(54) DYNAMIC VISION SENSING SYSTEM WITH A STATIC CAPTURING MODE

(71) Applicant: Hong Kong Applied Science and Technology Research Institute Co., Ltd., Shatin (HK)

(72) Inventors: Alwin Ming Wai Tam, Tsuen Wan (HK); Malik Saad Sultan, Hung Hom (HK); Xiuling Zhu, Shatin (HK); Kenny Kin Lung Chan, Kowloon (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 337 days.

(21) Appl. No.: 18/124,648

(22) Filed: Mar. 22, 2023

(65) Prior Publication Data

US 2024/0323517 A1     Sep. 26, 2024

(51) Int. Cl.
H04N 23/667 (2023.01)
G02B 5/00 (2006.01)
(Continued)

(52) U.S. Cl.
CPC ........... H04N 23/667 (2023.01); G02B 5/001 (2013.01); G02F 1/0136 (2013.01);
(Continued)

(58) Field of Classification Search
CPC ...... H04N 23/667; H04N 23/55; G02B 5/001; G02F 1/0136; G02F 1/13471;
(Continued)

(56) References Cited

U.S. PATENT DOCUMENTS 9,986,170 B2    5/2018  Shin et al.
10,331,008 B1*  6/2019  Tam ......................... G02F 1/29
(Continued)

FOREIGN PATENT DOCUMENTS

CN       109842404      6/2019
CN       111176432 A    5/2020
(Continued)

OTHER PUBLICATIONS

International Search Report and the Written Opinion of the International Searching Authority for International Application No. PCT/CN2023/083572, mailed Nov. 24, 2023, pp. 1-8.
(Continued)

*Primary Examiner* — Christopher K Peterson
(74) *Attorney, Agent, or Firm* — Warner Norcross + Judd LLP

(57)              ABSTRACT

A dynamic vision sensing system, which includes a dynamic vision sensor, a AI recognition module connected to the dynamic vision sensor, and a static mode triggering module coupled to the Ai recognition module. The static mode triggering module is adapted to trigger an intensity change in an environment captured by the dynamic vision sensor to observe a static object of interest, a property that conventional dynamic vision sensor failed to capture. The motion recognition module upon detecting a change of a motion in the environment is adapted to send a command to the static mode triggering module to trigger the intensity change. An AI controlled electro-optical system is therefore proposed to capture object of interest even if the object is static by triggering effective intensity change of the static object at sensing end, hence eliminate blind spot of existing DVS system.

20 Claims, 13 Drawing Sheets

(51) Int. Cl.

| | |
|---|---|
| *G02F 1/01* | (2006.01) |
| *G02F 1/1347* | (2006.01) |
| *G02F 1/135* | (2006.01) |
| *G02F 1/139* | (2006.01) |
| *G06V 10/62* | (2022.01) |
| *G06V 10/764* | (2022.01) |
| *G06V 10/77* | (2022.01) |
| *G06V 10/774* | (2022.01) |
| *G06V 10/82* | (2022.01) |
| *H04N 23/55* | (2023.01) |

(52) U.S. Cl.
CPC .......... *G02F 1/13471* (2013.01); *G02F 1/135* (2013.01); *G02F 1/1393* (2013.01); *G06V 10/62* (2022.01); *G06V 10/764* (2022.01); *G06V 10/7715* (2022.01); *G06V 10/774* (2022.01); *G06V 10/82* (2022.01); *H04N 23/55* (2023.01); *G02F 2203/48* (2013.01)

(58) Field of Classification Search
CPC .... G02F 1/135; G02F 1/1393; G02F 2203/48; G06V 10/62; G06V 10/764; G06V 10/7715; G06V 10/774; G06V 10/82
See application file for complete search history.

(56) References Cited

U.S. PATENT DOCUMENTS

| | | | |
|---|---|---|---|
| 10,969,599 B1 * | 4/2021 | McEldowney ...... | G02B 5/1833 |
| 10,983,262 B2 | 4/2021 | Tam et al. | |
| 2018/0039003 A9 * | 2/2018 | Tabirian ............ | G02B 27/4211 |
| 2020/0226377 A1 | 7/2020 | Campos et al. | |
| 2020/0302236 A1 * | 9/2020 | Gao ................... | G06F 18/2415 |
| 2020/0394418 A1 * | 12/2020 | Liu ...................... | G08B 29/186 |
| 2022/0108548 A1 | 4/2022 | Kim et al. | |
| 2022/0269910 A1 * | 8/2022 | Onzon ................... | G06N 3/045 |
| 2023/0030562 A1 | 2/2023 | Seo et al. | |
| 2024/0134053 A1 * | 4/2024 | Isler .................... | G06V 10/454 |

FOREIGN PATENT DOCUMENTS

| | | | |
|---|---|---|---|
| CN | 112991447 A | 6/2021 | |
| CN | 114095673 | 2/2022 | |
| CN | 114286024 | 4/2022 | |
| WO | WO-2021125550 A1 * | 6/2021 ............. G06V 40/20 |
| WO | 2021/147131 | 7/2021 | |

OTHER PUBLICATIONS

The First Office Action issued by the Chinese Patent Office for Application No. 202380008483.7, issued Nov. 26, 2025, pp. 1-12, including English translation.

* cited by examiner

Outputs: PS1/PS2

Outputs: AGPA

Display letter @
detector

DVS camera

DYNAMIC VISION SENSING SYSTEM WITH A STATIC CAPTURING MODE

FIELD OF INVENTION

This invention relates to Dynamic Vision Sensor (DVS) cameras to detect and recognize predefined action of an object using AI algorithm, and in particular to eliminate blind spots for the detection of the static object of interest by means of AI controlled electro-optical element.

BACKGROUND OF INVENTION

In recent years, DVS cameras have gained wide attention as they can encode a visual dynamic signal into an asynchronous microsecond precision event flow, and then generate frames through the event flow to track an object that is rapidly moving. DVS cameras offer significant advantages over standard frame-based cameras, for example a very high dynamic range, no motion blur, a latency in the order of microseconds, and lower power consumption since redundant information such as static environment information is not captured.

However, most DVS cameras are unable to capture static objects which are crucial in certain applications including human tracking and SLAM (Simultaneous Localization And Mapping), where the status of the object or environment can be lost for slowly moving or still objects relative to the sensor. As a result, there are blind spots of existing DVS system in terms of object recognition and capture.

SUMMARY OF INVENTION

Accordingly, the present invention in one aspect provides a dynamic vision sensing system, which includes a dynamic vision sensor, an AI recognition module connected to the dynamic vision sensor, and a static mode triggering module connected to the AI recognition module. The static mode triggering module is adapted to trigger an intensity change in an environment captured by the dynamic vision sensor to observe a static object. The AI recognition module upon detecting no change of a motion in the environment is adapted to send a command to the static mode triggering module to trigger the intensity change.

In some embodiments, the AI (Artificial Intelligence)-based motion recognition module includes an object detection module, and an action classification module connected to the object detection module. The object detection module is adapted to recognize an object of interest in the environment. The action classification module is adapted to detect for any classified action from the detected object of interest.

In some embodiments, the static mode triggering module is adapted to trigger the intensity change when the action of interest is detected.

In some embodiments, the object detection module is based on deep-learning, and includes a bottleneck CSP (Cross Stage Partial) layer; and a long short-term memory added to the bottleneck CSP layer. The bottleneck CSP layer is adopted with the added memory elements to obtain enhanced learning capability on spatiotemporal data.

In some embodiments, the action classification module is adapted to receive an input data flow from the object detection module, perform temporal shifting to the input data flow, and classify the action of interest of the object of interest.

In some embodiments, the motion recognition module is adapted to send the command to the static mode triggering module, if the object of interest disappears from the environment after the action of interest is detected by the action classification module.

In some embodiments, the static mode triggering module further includes an optical module located before the dynamic vision sensor on an optical path, and a control module connected to the optical module. The control module is adapted to output a control signal to the optical module upon receiving the command from the motion recognition module, so as to trigger the intensity change.

In some embodiments, the optical module is selected from the group consisting of a liquid lens electro-optical mechanical module, a micromechanical module, and a polarization controlled non-mechanical module. In the case of the liquid lens electro-optical mechanical module, the liquid lens electro-optical mechanical module for example may contain a liquid lens placed at a frontmost position before the lens module. The lens focusing power of the liquid lens is changed periodically to establish a small shift in focusing as to induce an intensity change at the dynamic vision sensor sensor behind the lens module for static scenery. Through the repeated switching between defocusing and focusing, the intensity is changed on the object(s) in the captured data flow of the DVS sensor, in particular at the edges of objects and images.

According to another aspect of the invention, there is provided a polarization-controlled optical module, which includes a circular polarizer adapted to filter a polarization from an incoming light to the circular polarizer at a predetermined handedness, and a GPA (Geometric Phase Axicon) module located after the circular polarizer on an optical path. The GPA module is adapted to alter the focus of an environmental scene inputted to the circular polarizer, as driven by a control signal.

In some embodiments, the GPA module includes a first polarization selector, a first GPA, a second polarization selector, and a second GPA. The first polarization selector, the first GPA, the second polarization selector and the second GPA are arranged on the optical path in sequence. The first polarization selector is adapted to control a handedness of filtered polarization by a first voltage signal. The second polarization selector is adapted to control a handedness of output of the first GPA by a second voltage signal. The second voltage signal is independent from the first voltage signal.

In some embodiments, the first voltage signal and the second voltage signal are configured to be reversed to each other, so that the focusing of the environmental scene as outputted by the second GPA is altered.

In some embodiments, each one of the first and second polarization selectors is an electronically controlled birefringence liquid crystal half wave plate (LC-HWP) that reverses a polarization state of a light received at the LC-HWP.

In some of the embodiments, each one of the first and second polarization selectors includes a ferroelectric liquid crystal half wave plate (FLC-HWP) sandwiched between two quarter waveplates (QWP). The FLC-HWP is connected to an electronic driving circuitry.

In some embodiments, an optics axis of the FLC-HWP rotates in the plane of the substrate of the FLC-HWP when a voltage applied to the FLC-HWP by the electronic driving circuitry changes from a negative voltage to a positive voltage, or vice versa.

In some of the embodiments, the GPA module contains an active geometric phase axicon (AGPA). The AGPA is adapted to control the focus of the environmental scene as driven by the control signal.

In some embodiments, the GPA module is configured to periodically change the focusing of the environmental scene to trigger an intensity change of a static object in the environmental scene.

According to a further aspect of the invention, there is provided a method of capturing a static object using a dynamic vision sensor. The method includes the steps of triggering an intensity change in an environment captured by the dynamic vision sensor, and observing the static object in the environment.

In some embodiments, the method further includes the steps of detecting and recognizing an object of interest in the environment, and using an action classification module to detect an action of interest, using AI based algorithms. If any object of interest disappears as a result of becoming static after the detection of some classified action, the static mode is triggered and initiates to reconstruct the state and features of the static object of interest.

In some embodiments the object detection step further includes a Convolutional Neural Network (CNN) backbone to extract features from the image. The neck module generates a features pyramid with added memory elements which are Long Short Term Memory (LSTM) to detect different sizes and scales of objects. Finally, the head module provides a final detection with labels. The sequence of the detected object of interest is inputted to the action classification module. The base model uses the CNN to compute the features, and a temporal shift module moves the feature map along the temporal dimension to capture temporal relationship for accurate action classification.

In some embodiments, the triggering step includes a micro-electro-mechanical system (MEMS) to vibrate the sensor to establish an intensity change at each DVS pixels under the vibrational motion when the environmental scene is captured.

One can see that embodiments of the invention greatly expand the functionality of DVS cameras that not only they can track an object that is rapidly moving as the original designed function of DVS cameras, but also in circumstances where one or more static object needs to be recognized and captured, the dynamic vision sensing systems including the DVS camera can be switched to a static capturing mode, in which static object(s) can be captured with intensity changes at the boundaries of the static object(s). The dynamic vision sensing systems and methods proposed by embodiments of the invention thus overcome the shortcomings of DVS cameras which are sensitive only to dynamic objects.

In addition, with the aid of AI and in particular deep-learning, dynamic vision sensing systems according to some embodiments of the invention achieve motion recognition, and can identify various actions of interests (e.g., a person falling to the ground unconsciously). The actions that can be recognized can be expanded by training the AI engine with more data, which provides possibilities to apply the dynamic vision sensing systems to many different industries such as video surveillance, animal keeping, patient monitoring, to name a few. For example, the dynamic vision sensing systems can be used for accident detection such as construction equipment supervision, people flow detection in shopping malls, outdoor restricted area surveillance, environment hazard detection and prevention.

In addition, thanks to the use of GPA modules in some embodiments of the invention, the static object capturing can be achieved by controlling the GPA module via voltage control signals, and there is no mechanically moving parts are involved. As such, dynamic vision sensing systems with the static capture mode according to these embodiments can be made compact and light-weighted, and at the same time consume little energy. Also, the dynamic vision sensing systems according to embodiments of the invention possess the advantages of fast response, low power consumption, and high resolution-since the static capturing is performed by external optics so the high resolution of the DVS camera is not affected.

BRIEF DESCRIPTION OF FIGURES

The foregoing and further features of the present invention will be apparent from the following description of embodiments which are provided by way of example only in connection with the accompanying figures, of which.

In the drawings, like numerals indicate like parts throughout the several embodiments described herein.

DETAILED DESCRIPTION

Figure 1:
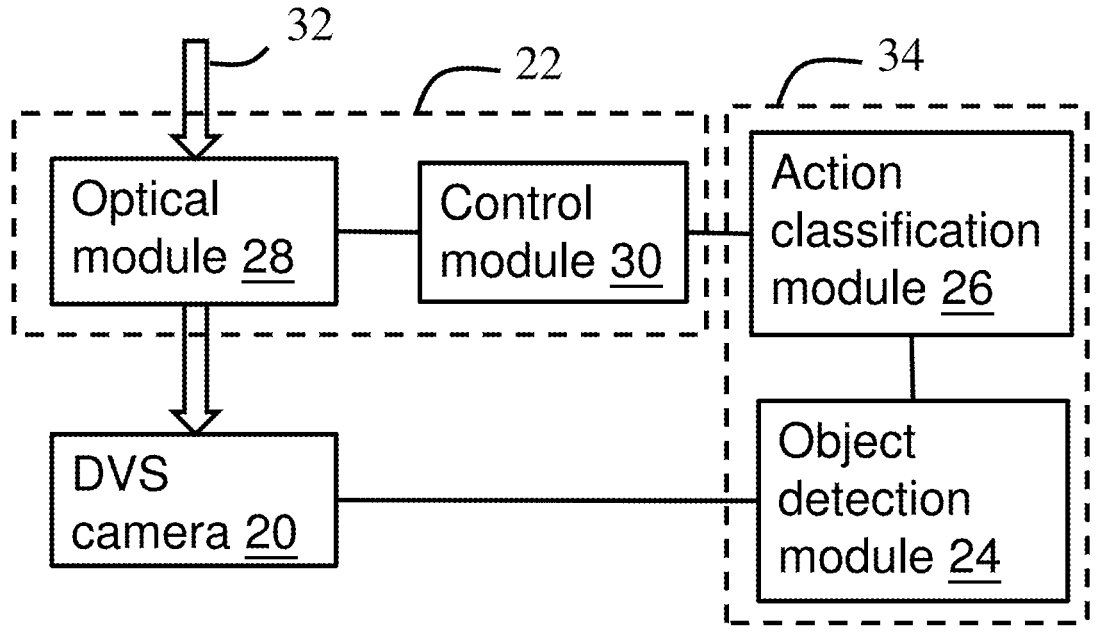
FIG. 1 is the schematic diagram of a dynamic vision sensing system according to an embodiment of the invention.

FIG. 1 shows the structure of a dynamic vision sensing system according to an embodiment of the invention, which includes a DVS camera 20 and two modules for providing a static capturing function for the DVS camera 20, which are respectively an AI recognition module 34 and a static mode electro-optical triggering module 22. The DVS camera 20 is a dynamic vision sensor which is well-known to skilled persons in the art. The AI recognition module 34 includes two sub-modules including an action classification module 26 and an object detection module 24, and the DVS camera 20 is connected to the object detection module 24 such that an output data flow from the DVS camera 20 is inputted to the object detection module 24. The object detection module 24 is connected to the action classification module 26 such that an output data flow from the object detection module 24 is inputted to the action classification module 26. The static mode triggering module 22 also contains two sub-modules which are an electronic control module 30 and an optical module 28. The driving signal of the electronic control module 30 is regulated by the action classification module 26 and is adapted to receive a command signal from the latter. The electronic control module 30 is also connected to the optical module 28 and is adapted to output a control signal to drive the optical module 28 to create a focusing shift that triggers an intensity change of the static objects in a sensed environment at the DVS camera 20 when the command signal received by the electronic control module 30 from the action classification module 26 becomes or remains active. The action classification module 26 of the AI recognition module 34 upon detecting a change of a motion in the environment captured by the DVS camera 20 is adapted to send the command signal to the static mode triggering module 22 to trigger the intensity change of the static objects through focusing shifts. The change of the motion includes in particular an action of interest by an object of interest in the environment, as will be described in details below.

It should be noted that the AI recognition module 34 including the action classification module 26 and the object detection module 24 in this embodiment are based on AI, and are implemented over hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks. On the other hand, the electronic control module 30 contains at least a combination of hardware and software, and its hardware portion is adapted to output a voltage signal as the control signal to the optical module 28. The optical module 28 in this embodiment does not contain any movable parts so it is no-mechanical, rather the optical module 28 contains various optical elements as will be described in more details below, and at least one of the optical elements is an active element that is controllable by a voltage signal. What is illustrated in FIG. 1 is an optical path indicated by arrow 32 which shows how light reflected or emitted from a target (e.g., a physical environment containing objects) passes through the optical module 28 and then arrive at and captured by the DVS camera 20. It is the optical module 28 that directly enables the DVS camera 20 to capture static objects in the environment, but the optical module 28 does not modify the structure of DVS camera 20. Rather, the optical module 28 acts as an add-on in the optical path before the DVS camera 20.

Figure 2:
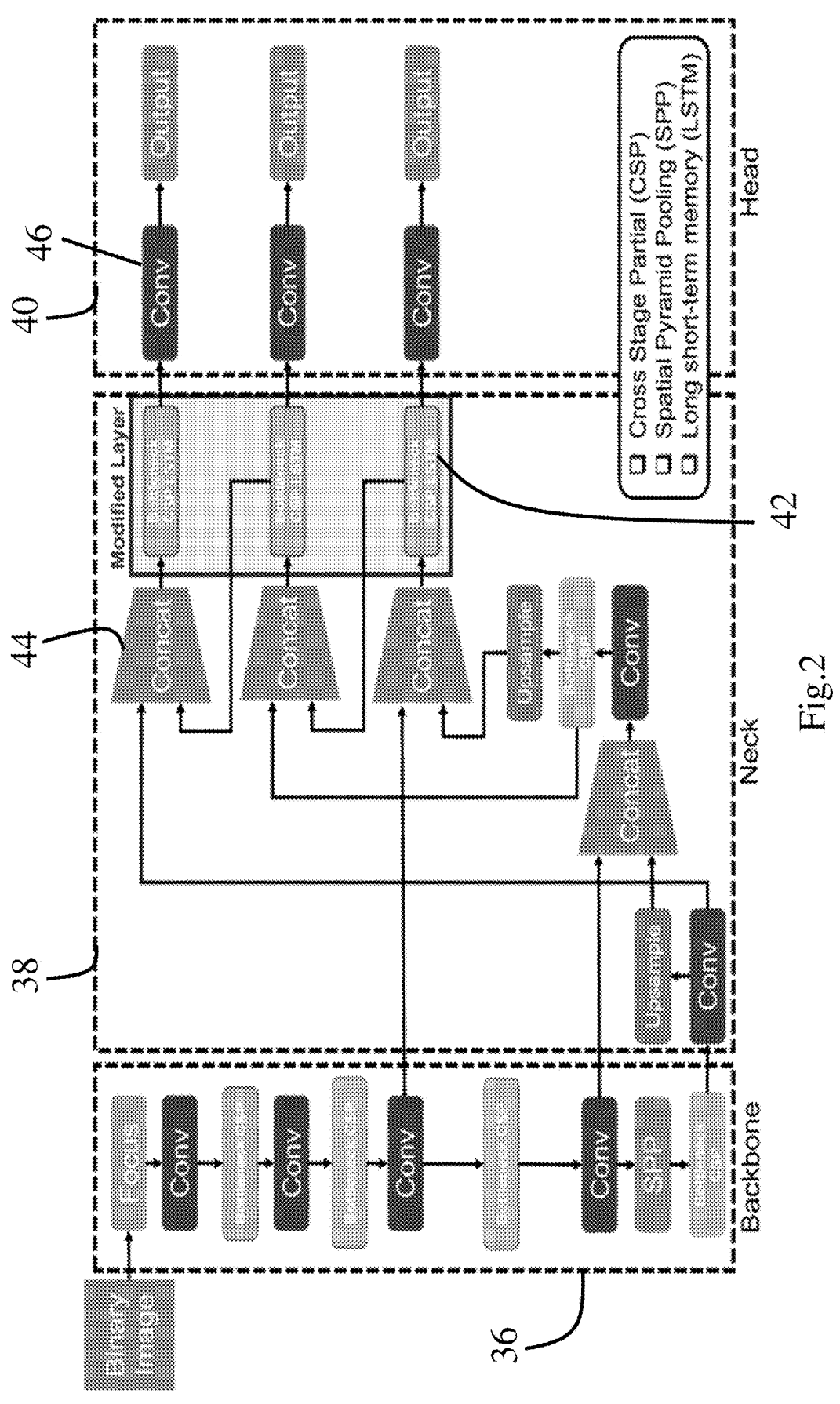
FIG. 2 shows the structure of the object detection module in the system of FIG. 1 which is based on a modified YoloV5 model.

The object detection module 24 is adapted to recognize an object of interest in the environment as captured by the DVS camera 20 as the DVS camera 20 provides sequential data flow of the sensed environment to the object detection module 24. FIG. 2 shows a schematic diagram of the object detection module 24, which is based on the YoloV5 architecture. YoloV5 (Yolo means "You Only Look Once"), as being well-known to skilled persons in the art, is an object detection algorithm based on deep-learning, and was developed by Ultralytics© using the Pytorch framework. YoloV5 detects and recognizes various objects in an image in real-time, and it divides images into a grid system. Each cell in the grid is responsible for detecting objects within itself. As shown in FIG. 2, the YoloV5 architecture includes three main pieces, namely a backbone module 36, a neck module 38, and a head module 40. The backbone module 36 is a convolutional neural network that aggregates and forms image features at different granularities. The neck module 38 is a series of layers to mix and combine image features to pass them forward to prediction. The head module 40 consumes features from the neck module 38 and takes box and class prediction steps. However, there are limitations of standard YoloV5 models in being used for dynamic vision sensing, because the YoloV5 model was designed for frame by frame prediction, and is not suitable for sequential data video. As such, standard YoloV5 models cannot relate the prediction in previous frame(s), resulting in a low accuracy.

Figure 3:
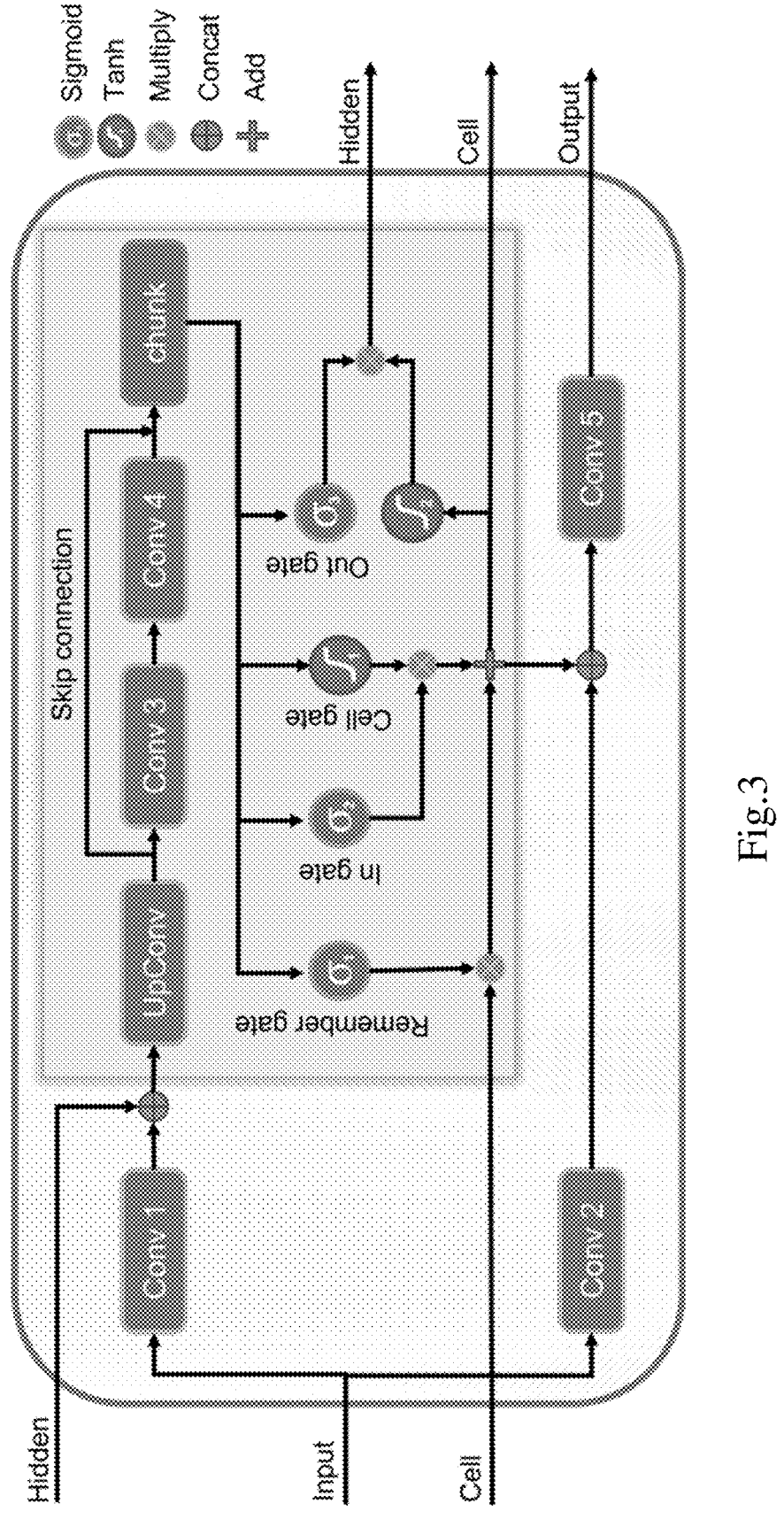
FIG. 3 shows an exemplary structure of the bottleneck CSP LSTM layer in the objection detection module of FIG. 2.

To solve this deficiency, the modified YoloV5 model implemented for the object detection module 24 contains bottleneck CSP (Cross Stage Partial) layers each added with a long short-term memory. In other words, bottleneck CSP long short term memory (LSTM) layers 42 replace bottleneck CSP layers in standard YoloV5 models to connect between Concats 44 (i.e. concatenations) in the neck module 38 and convolution layers 46 in the head module 40. As shown in FIG. 2, the specific embodiment contains three bottleneck CSP LSTM layers 42 each of which is connected between a respective Concat 44 and a respective convolution layer 46. The bottleneck CSP LSTM layers 42 enable the object detection module 24 to properly and efficiently process sequential data, and the LSTMs are added in a way to maintain roughly the same speed of processing with a high accuracy on sequential event data. Since a sudden change in motion will affect the visible structure in the even data flow, the object detection module 24 provides a smooth detection of such changes over time. The bottleneck CSP LSTM layers 42 in the object detection module 24 are designed to learn spatiotemporal features, which help achieve robust detection on sequential event data. FIG. 3 shows an exemplary structure of the bottleneck CSP LSTM in FIG. 2, and it can be seen that the layer architecture is a constituent of convolution and memory blocks.

Figure 4:
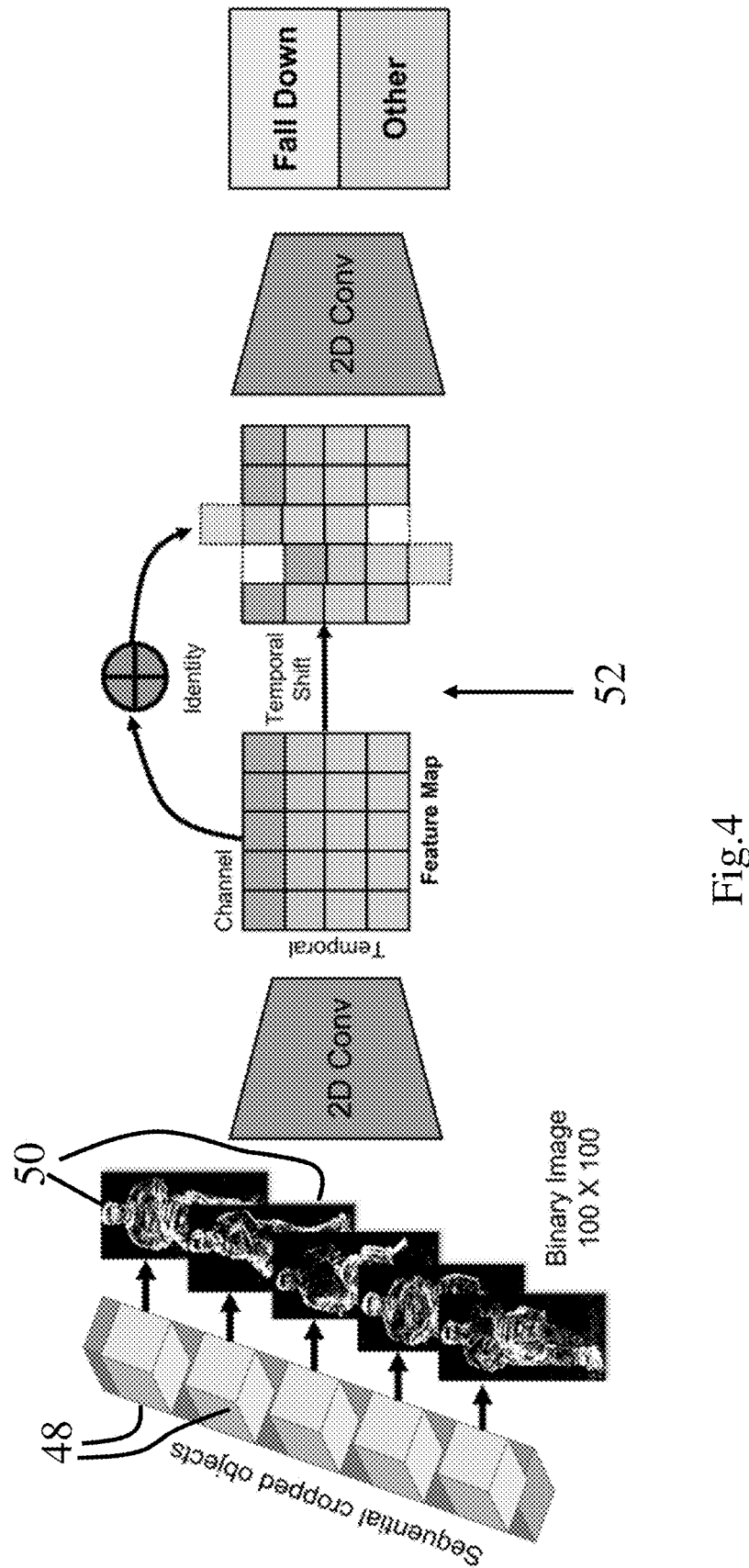
FIG. 4 illustrate the structure and working principle of the action classification module in the system of FIG. 1.

The action classification module 26 mentioned above is adapted to detect if an action of interest of the object of interest occurred in the sensed environment. The static mode triggering module 22 is adapted to trigger the intensity change when the action of interest is detected by the action classification module 26. For example, the action of interest may be that an object of interest such as a person suddenly disappears from the environment. FIG. 4 shows the structure of the action classification module 26, as well as working principle using multiple sequential cropped objects 48 as an example. The action classification module 26 receives an input data flow (i.e. the multiple sequential cropped objects 48 in this example) from the object detection module 24, and converts each one of the multiple sequential cropped objects 48 into a binary image 50. The binary images 50 are then subjected to a temporal shift module algorithm 52 for classifying the action of interest of the object. In doing so the temporal shift module algorithm 52 performs temporal shifting and two-dimensional convolution of the binary image 50. The temporal shifting techniques and two-dimensional convolution in convolutional neural networks are well-known to those skilled, so they will not be described in further details here. After the temporal shifting and 2-D convolution, the action classification module 26 is able to determine if the binary image 50 represent an action of interest of the object, and if yes, classify the action of interest, for example if the person is falling down to ground suddenly.

Figure 5:
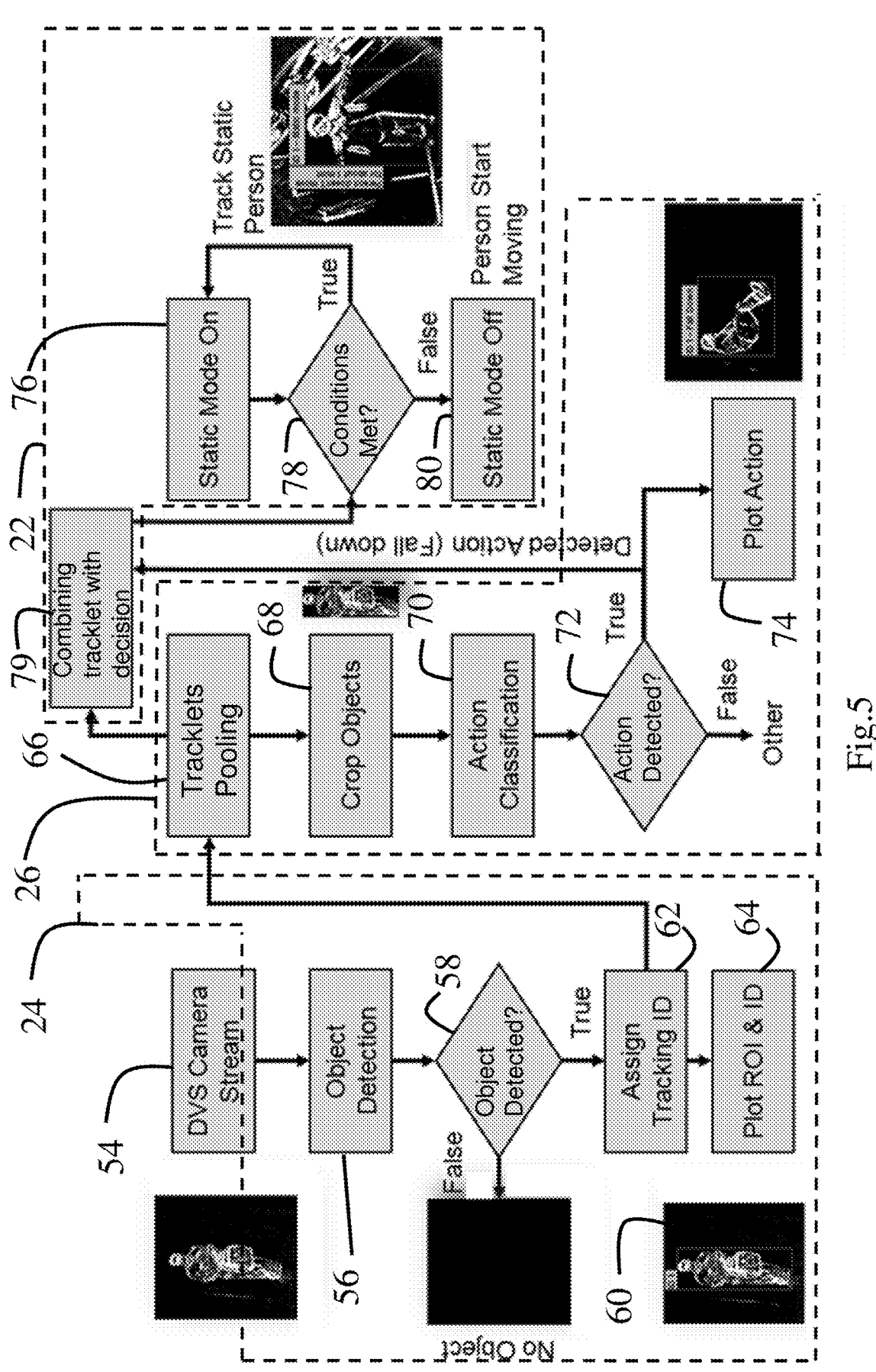
FIG. 5 is a flowchart showing the method of recognizing and classifying an action of interest of an object of interest, and entering a static capturing mode of the dynamic vision sensing system in FIG. 1.

Having introduced the structures and/or functions of various modules in FIG. 1, the descriptions now go to the working principle of the dynamic vision sensing system in FIG. 1 in terms of how to decide whether to enter the static capturing mode or not. As illustrated in FIG. 5, the method starts at Step 54, in which the DVS camera 20 initially captures a video stream (i.e. sequential data). At this moment the system is detecting for object(s) of interest in the scene, and before this is done the system does not know if there are object(s) in the environment captured by the DVS camera 20. Next, the object detection module 24 attempts to detect the presence of any object in Step 56, and makes a judgement in Step 58 as to whether an object is detected. If it is determined in Step 58 that there is no moving object in the sensed environment at all, the system goes back to Step 54 and continue detecting object of interest in video streaming in the scene. If it is determined in Step 58 that there are one or more objects in the sensed environment a (e.g. a person as he/she is standing as shown in image 60), then the method proceeds to Step 62 in which the object or each object is assigned a tracking ID. Once Step 62 is completed, in Step 64 a ROI (region of interest) is plotted and the tracking ID is shown for example on a display device (not shown in FIG. 5) for a user of the dynamic vision sensing system to observe. It should be noted that Step 64 is optional and not directly related to the static capturing method flow shown in FIG. 5.

After the object(s) is assigned the tracking ID in Step 62, the method also proceeds to Step 66 in which an object of interest is processed by the action classification module 26 with tracklets pooling to generate multiple sequential objects ready for action classification. In particular, for each tracking ID in Step 62 a tracklet is created in Step 66. A tracklet pooling module (not shown) keeps the coordinates of small number of consecutive frames of the specific ID, which will be used later in Step 79. The object of interest may be the object detected in Steps 56 and 58, or if there were multiple objects detected, then the object of interest may be one or more of the detected objects. For each object of interest, Steps 66 to 74 are carried out. After Step 66, the sequential objects are then cropped in Step 68 and each of the sequential objects is cropped with reference to FIG. 4. Subsequently, the binary images of the object of the interest are analysed by the action classification module 26 in Step 70 for action classification in an attempt to identify an action of interest. The action of interest is pre-defined by user of the dynamic vision sensing system and recognisable by the action classification module 26 after it is trained with sufficient datasets. Examples of actions of interests include a car crash on the road, and a person falling down to street as previously mentioned. The action classification module 26 then makes a judgement in Step 72. If it is determined in Step 72 that there is no action of interest identified (e.g. the person is behaving normally like standing or sitting), then the method does not proceed to activation of the static capturing mode since the static capturing is not necessary in this case. If it is determined in Step 72 that there is an action of interest of the object of interest occurred, then the method proceeds to Step 74 in which the action of interest is plotted for example on the display device for the user of the dynamic vision sensing system to observe. It should be noted that Step 74 is optional and not directly related to the static capturing method flow shown in FIG. 5.

If it is determined in Step 72 that there is an action of interest of the object of interest occurred (e.g. a person falling down), then the methods moves to Step 79. In Step 79, the decision from Step 72 and the tracklet from Step 66 are combined, and inputted to Step 78. In Step 78, two conditions are checked to see if they are met, which are 1) if the action of interest is detected; and 2) if the object of interest doesn't move. If both conditions are true then the method proceeds to Step 76 in which the action classification module 26 based on its identifying of the action of interest sends a command signal to the static mode triggering module 22, and the latter switches the dynamic vision sensing system to the static capturing mode. In the example of the person falling down to street as an action of interest, the person after he/she fell down will disappear from the environment captured by the DVS camera 20 and the DVS camera 20 alone cannot continue to capture the person, because as the person fell on the ground he/she will not move relative to the environment, and thus does not result in a change of intensity that can be captured by the DVS camera 20 itself. The static capturing mode is therefore necessary for the DVS camera 20 to capture the person after he/she fell on the ground and became static. After the static capturing mode is turned on, the DVS camera 20 as enhanced by the static mode triggering module 22 is then able to track the static person and captures his/her image through focusing change. Various apparatuses and their operation methods will be described later for the optical module 28 of the static mode triggering module 22 that assists the DVS camera 20 to capture static objects. Once the dynamic vision sensing system is placed into the static capturing mode in Step 76, the object detection module 24 regularly/continuously provides the current location of the object of interest in step 78 to see if certain conditions are met e.g., the object of interest starts moving again, so that the static capturing mode can be turned off. It is desirable to minimize the time the dynamic vision sensing system being in the static capturing mode because this will make the main function of the DVS camera 20 which is to minimize the redundant information (typically, information generated by the background objects does not provide useful information) compromised, if the static scenery is always captured. Therefore, the static capturing mode is configured only when it is necessary i.e. any detected object of interest is lost as a result of being static at certain moments e.g. a person (object of interest) fell down and not moving afterwards, and if not, the DVS camera 20 is by default in the moving object tracking mode (i.e. dynamic mode). In Step 78, if the condition for enabling the static capturing mode persists, then the method goes back to Step 76 and keeps iterating between Steps 76 and 78.

However, if in Step 78 it is found that conditions for enabling the static capturing mode no longer exist, then the method will go to Step 80 in which the static capturing mode is turned off. An example of the removal of the condition for static capturing mode is a person after he/she fell down on the ground quickly starts moving again, say standing up and walking, which may indicate that the person did not get hurt or does not require urgent medical attention. As the person starts moving again no static capturing mode is needed anymore, but the moving object tracking mode is sufficient for tracking the person from then on.

It should be noted that Step 80 is not the termination of operation of the dynamic vision sensing system. Rather, the method flow shown in FIG. 5 continuously runs (e.g. from Step 54 to Step 72), and the dynamic vision sensing system keeps tracking moving objects. As soon as an action of interest of an object of interest is detected, the dynamic vision sensing system may be put into the static capturing mode again.

The action classification module 26 and the object detection module 24 are both based on AI and in particular deep-learning. As skilled persons in the art understand, any AI model is based on learned data. For the action classification module 26 and the object detection module 24 they are configured for recognizing objects/actions after they are trained using a vast number of object images. The number of objects is limitless, and various views of those objects are also limitless. As such, the training of the AI model to recognize objects can be refined. Here an object paste augmentation method for the object detection module is proposed. To enhance the model capability to distinguish between different objects in the environment, a gallery image was created that covers vast indoor objects. During the training a random spatial location was cropped from the gallery image and was further augmented like random flip/rotation etc. and paste on random location on the input image. The other standard augmentation techniques were also used.

Figure 6A:
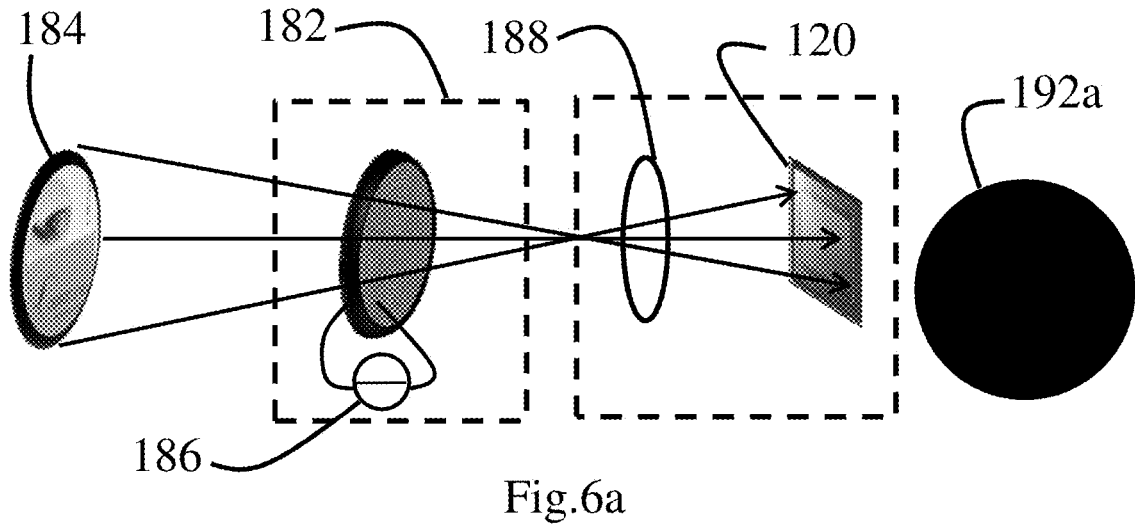
FIG. 6a illustrates the working principle of a triggering optical module containing a GPA module for a DVS sensor according to one embodiment, when the optical module is deactivated.
Figure 6B:
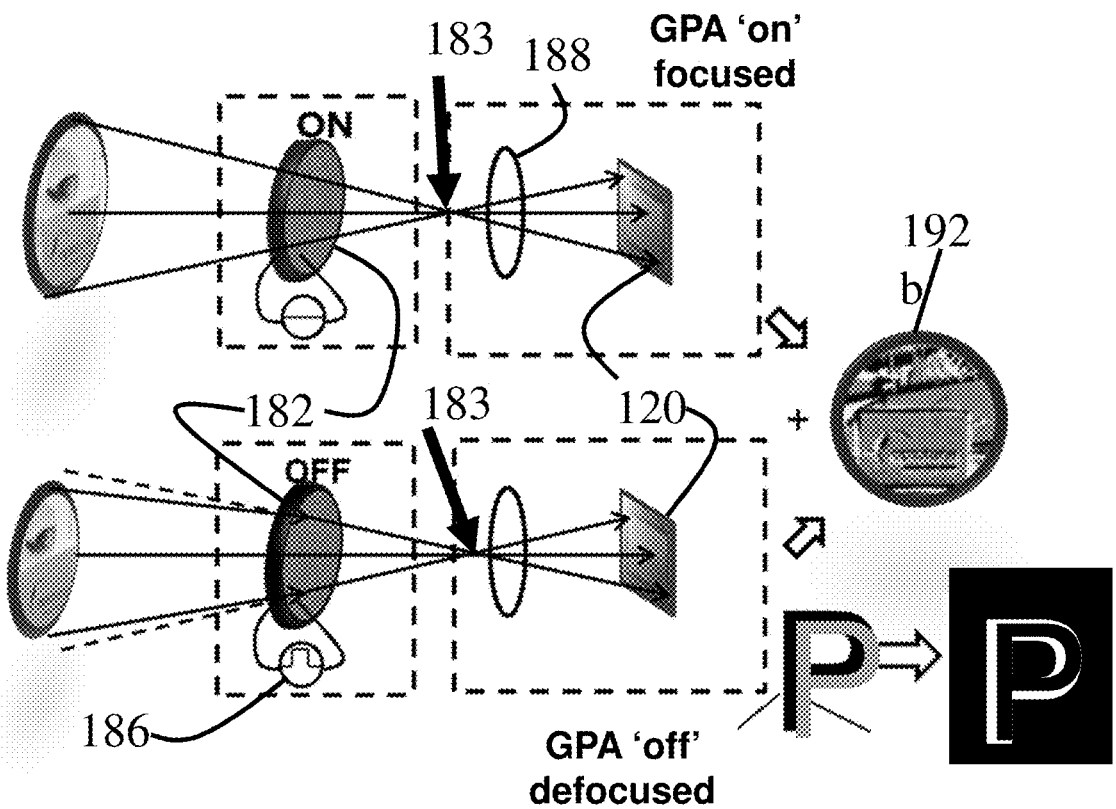
FIG. 6b illustrates the working principle of the triggering optical module in FIG. 6a when the optical module is activated.

The optical module of the static mode triggering module for dynamic vision sensing systems according to embodiments of the invention is now described. For example, the optical module described below can be used in the dynamic vision sensing system as shown in FIG. 1. It should be noted that the structure and underlying working principle of the optical module are not limited to any particular implementations, because any type of optical module that facilitates an intensity change in the environment as captured by the DVS camera in a controllable way, may be used for the dynamic vision sensing systems. FIGS. 6*a* and 6*b* show an optical module according to one embodiment of the invention, which makes use of a GPA module 182. The optical module contains additionally a lens 188. The GPA module 182, the lens 188, and a DVS camera 120 are located substantially along a straight line, which follows an optical path (not shown) for an environment to be optically captured by the DVS camera 120. The environment is represented by an environment scene 184 in FIGS. 6*a*-6*b* and for the sake of describing the static mode triggering module, the environment scene 184 is a static scene. The DVS camera 120 is an event sensor array. The lens 188 is optional, and it is used to achieve readjustment of the system focusing due to the effect of GPA module 182 as a plug-in before the DVS camera 120.

The GPA module 182 is polarization-controlled non-mechanical module. The GPA in the GPA module 182 as being well-known to skilled persons is a specialized circularly polarized dependent diffractive optical element, with linearly varying phase profile along the radial distance established by means of geometric phase. The GPA typically has a flat and compact appearance, and provides polarization-reconfigurable optical response due to the geometric phase. Although not shown, the GPA includes optically anisotropic material(s) such as liquid crystal and metasurface. The GPA is configured the focusing of the light towards the DVS, acting as a variable axicon lens. The transmission function immediately at the output of the optically anisotropic dielectric type GPA can be expressed in matrix form as $$T(r) = \cos\left(\frac{\Gamma}{2}\right)I - $$
$$i\sin\left(\frac{\Gamma}{2}\right)[(-i\sigma_1 + \sigma_2)\exp(i2\alpha(r)) + (i\sigma_1 + \sigma_2)\exp(-i2\alpha(r))] \quad \text{Eq. (1)}$$

where T(r) is the transmission function;

$$I = \begin{bmatrix} 1 & 0 \\ 0 & 1 \end{bmatrix}$$

is the identity matrix;

$$\sigma_1 = \begin{bmatrix} 0 & 1 \\ 1 & 0 \end{bmatrix}, \sigma_2 = \begin{bmatrix} 1 & 0 \\ 0 & -1 \end{bmatrix}$$

are the Pauli spin matrices, $\Gamma$ is the retardation, r is the radial distance from the center of the GPA, and $\alpha(r)$ is the spatially varying optic axis orientation distribution of the anisotropic dielectric material. See: Alwin Ming Wai TAM et al., "Bifocal optical-vortex lens with sorting of the generated non-separable spin-orbital angular momentum states." *Phys. Rev. Appl., vol.* 7, 034010 (2017), the disclosure of which is incorporated by reference herein.

Figures 9, 10:
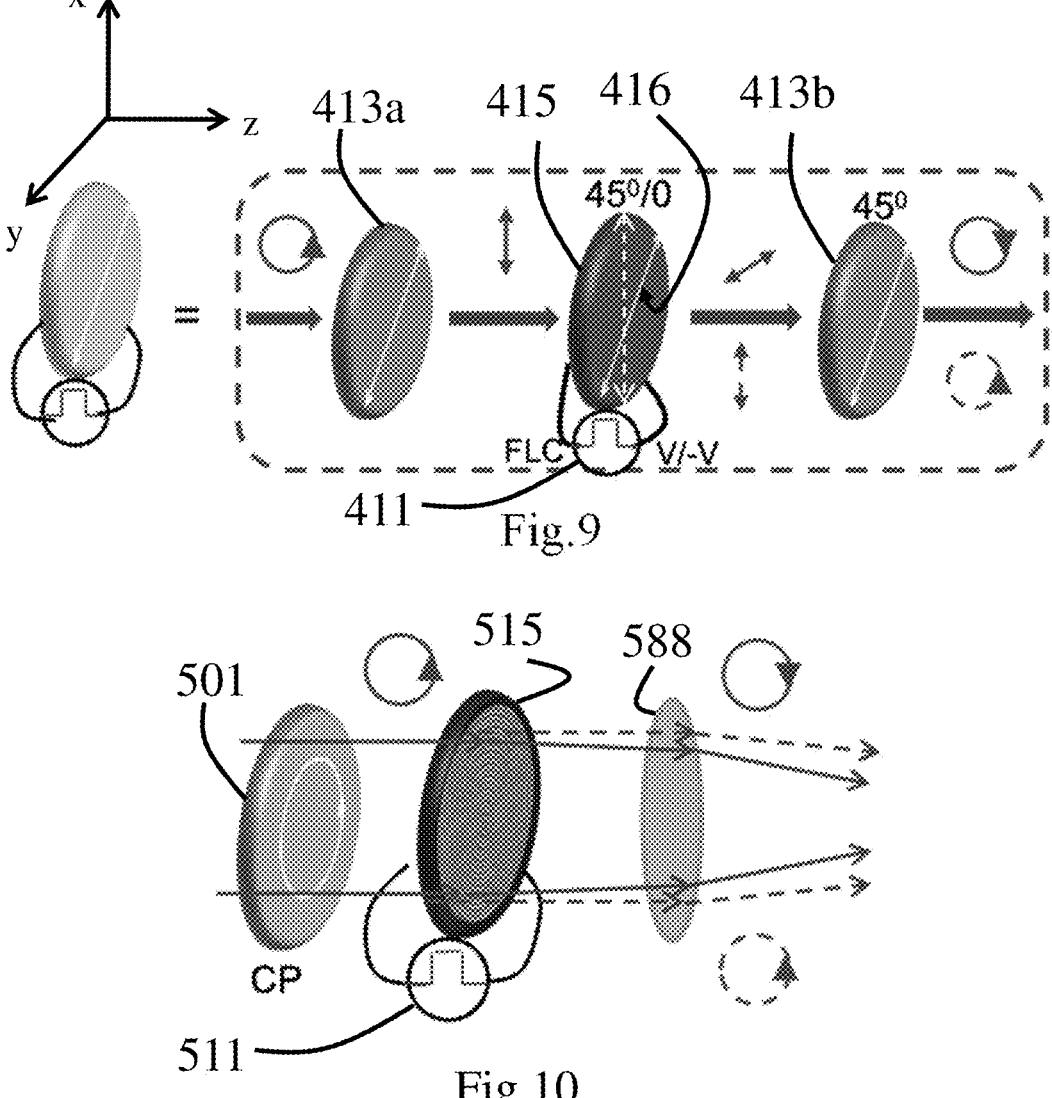
FIG. 9 illustrates the structure and working principle of a polarization selector for use in GPA modules that is based on FLC, according to another embodiment.
FIG. 10 shows the structure of a triggering optical module which contains an active GPA module, according to another embodiment.

The optics axis (corresponds to the slow propagation axis in an anisotropic medium) angular orientation distribution for the GPA is, $$\alpha(r) = \frac{\pi}{P}r \quad \text{Eq. (2)}$$

where P is the periodicity of the optics axis orientation in the GPA. In Eq. (1), the complex exponential, which corresponds to the geometric phase component, is governed by the spatial optic axis distribution of the LC layer $\alpha(r)$. The first term in Eq. (2) represents the 0th-order non-diffracting component for which the propagation behaviour of the light is unmodulated. The second and third terms involve the complex geometric phase exponentials $\exp[i2\alpha_{GPL}(r)]$ and $\exp[-i2\alpha_{GPL}(r)]$, correspond to the 1st and −1st diffracted order of the GPA, respectively. It is easy to verify when the second term of the transmission function in Eq. (1) operates on the right-handed circular polarized (RHCP) beam i.e., $$E_{in} = \frac{1}{\sqrt{2}}\begin{bmatrix} 1 \\ -i \end{bmatrix},$$

the second term vanishes, while when operating on the left-handed circular polarized (LHCP) incident beam i.e., $$E_{in} = \frac{1}{\sqrt{2}} \begin{bmatrix} 1 \\ i \end{bmatrix},$$

the magnitude of the resultant output vector becomes 1, and the circularly polarized state of the beam reverses to LHCP. Conversely, when the matrix operator in the third term in Eq. (1) operates on the LHCP beam, the third term vanishes, while when operating upon the RHCP beam, the magnitude of the resultant output vector becomes 1, and the circularly polarized state reverses to LHCP. The opposite signs of the complex phase argument in the second and the third terms are associated with the LHCP and the RHCP of the incident beam respectively, depicting the optical response of the 1st and −1st diffracted order being different, highlighting that the GPA is circularly polarized sensitive. Therefore, manipulating the circular polarization handedness of the incident light will alter the optical response that results in a change in intensity at the sensor. Using active liquid crystal (LC) waveplates can control the circular polarization handedness of the incident light at the GPA under electro-optical switching, to establish change in intensity at the sensor for static mode detection when necessary. Another non-mechanical approach to trigger the static object in the scenery is by electro-optically modulating the retardance (T) of the GPA. The retardance can be manipulated when the GPA is electro-optically active, constituting of electro-optical birefringent material, for example LC, in the device, and the retardance becomes voltage dependent i.e., $\Gamma(V)$. Under the condition when the retardation of the AGPA satisfies the half-wave condition at a given applied voltage i.e. $\Gamma(V)=\pi$, the first term in Eq. (1) corresponding to the non-diffracting wave component vanishes, and the AGPA behaves as a ray converging/diverging electro-optical device given that the polarization state of the beam is LHCP/RHCP, as depicted in FIG. 10. However, when the retardation vanishes under a given applied voltage i.e. $\Gamma(V)=0$, the second and third terms corresponding to the diffracting term in Eq. (1) vanish, and the 1st non-diffracting term becomes the dominating term, signifying the beam converging/diverging effect of the AGPA being suppressed and the device becoming optically isotropic. Thus, by electro-optically regulating the retardation $\Gamma(V)$ from 0 and x, will establish a change in intensity of the sensor for static object triggering in the scenery.

In one example, the GPA contains a plurality of liquid crystals (not shown) with various orientations. With these different orientations, the GPA is able to provide different diffractive effects to incoming light depending on the circular polarization handedness of the incoming light. Compared to other solutions like electro-mechanical modules, the GPA is less bulky, more durable, having greater mechanical stability and consumes much less energy. There are known applications of GPAs including optical trapping, microscopic imaging via long depth of field, and material inspection (encountering attenuation loss of material via. reshaping property of non-diffracting Bessel beam). However, in this embodiment, the GPA is utilized for its function of changing the focus in the two-dimensional (2-D) transverse directions, so as to achieve intensity change of the sensed environment by the DVS camera in order to capture static objects. The GPA module 182 contains an electronic control module 186 which is also a power module that outputs a control signal to the GPA upon receiving a command signal from the motion recognition module to trigger the intensity change.

The GPA module 182 is an active device, and is adapted to switch between focusing ON-OFF states. The dynamic vision sensing system containing the GPA module 182 is able to work in one of two modes, i.e. a dynamic mode (e.g. for moving object tracking) as shown in FIG. 6a, and a static capturing mode as shown in FIG. 6b. In the dynamic mode, a constant root mean squared (RMS) voltage signal is applied at the GPA module 182 and only dynamic objects can be captured. Thus, for a static environment scene 184 in FIG. 6a, there is no change to the light received at the DVS camera 120 because the intensity profile of the focusing beam at the GPA module 182 is unchanged and will not modulate the light path impinged at the DVS camera 120. Since the light path is unchanged, therefore the intensity will not change, the static environment scene 184 cannot be captured by the DVS camera 120 which as mentioned above only works for data flow with a changing intensity. The static environment scene 184 as captured in the dynamic mode of the dynamic vision sensing system appears like a hollow shape 192a with no content, and thus no objects or their poses within the static environment scene 184 can be captured.

Figure 12A:
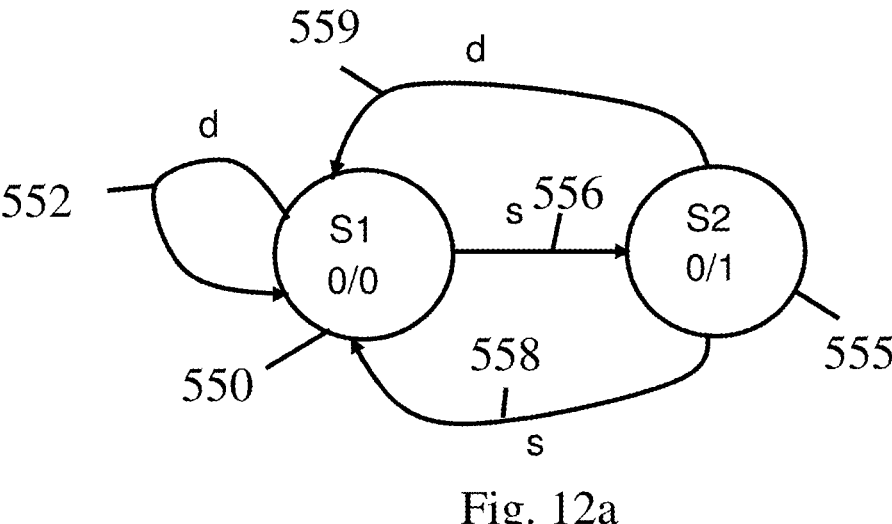
FIG. 12a is the finite state machine diagram describing the state of the polarization selectors in FIG. 7 for the static mode triggering electro-optical module.

The operation flow of an exemplary implementation of the GPA module 182 is illustrated from the finite state machine diagram in FIG. 12a, where the GPA module 182 contains polarization selectors. More details of this exemplary implementation will be provided later with reference to FIG. 7. In the GPA module 182 of FIG. 7, there are a first polarization selector (PS) 203 and a second polarization selector 207, which in the status shown in FIG. 6b are in its 'low' voltage state as described by '0/0' in state S1 550 during the dynamic mode of operation. If the retardation of both polarization selectors 203, 207 exactly satisfies the half-wave condition under when there is no applied voltage, the 'low' voltage state is equivalent to the voltage signal being 'off'. The loop arrow 'd' 552 at state S1 550 in FIG. 12a depicts that the polarization selectors 203, 207 will always remain in state S1 550 during the dynamic mode of operation.

In comparison, in the static capturing mode which is also shown in FIG. 6b, the GPA module 182 is switching between focusing 'on' and focusing 'off' repeatedly, resulting in constant changes in focusing of the incident light. Such an operation is summarized in the finite state machine diagram in FIG. 12a where before the triggering of the static mode, the polarization selectors 203, 207 are in state S1 550. When the static capture mode is activated subjected to a particular action of interest from the monitored object, the state will transit back ('s' arrow 558) and forth ('s' arrow 556) for each clock cycle between state S1 550 and state S2 (i.e., the first polarization selector 203 being in the 'low' voltage state and the second polarization selector 207 being in the voltage 'high' voltage state signified by '0/1') 555, establishing pixel shift at all directions to trigger intensity changes in the static environment scene 184 in FIG. 6b. The change in focal point 183 results in a change in FOV in FIG. 6b, as one can see that when the focusing of the GPA module 182 is switched 'on', the intersection points of the chief rays at different angular fields moves backwards to be closer to the DVS camera 120. Therefore, the FOV will be narrowed by angular deflection from GPA at all directions. Through the continuous focusing ON-OFF switching of the GPA module 182, images received at the DVS camera 120 will therefore experience intensity changes at the boundaries of the static objects in the static environment scene 184, and the boundaries can be traced and captured by the DVS camera 120 as shown in the image 192b, from which a user can readily see objects in the static environment scene 184 with tracked edges. In the example of an object being a letter "P" as shown in FIG. 6b, two different focus states, namely focus and defocus state, resulting in two-dimensional offsets of pixels at the boundaries of the letter, and thus intensity changes resulted from the offsets can be captured by the DVS camera 120. Indeed, if the static mode of operation is changed to the dynamic mode subjected to the change in the trigger signal 168 in FIG. 6b, FIG. 12a shows that the state of the polarization selectors 203, 207 will return to state S1 550 as indicated by the 'd' arrow 559, and continue to remain in state S1 as depicted by the 'd' loop arrow 552 if the dynamic mode of operation continues.

Figures 7, 8:
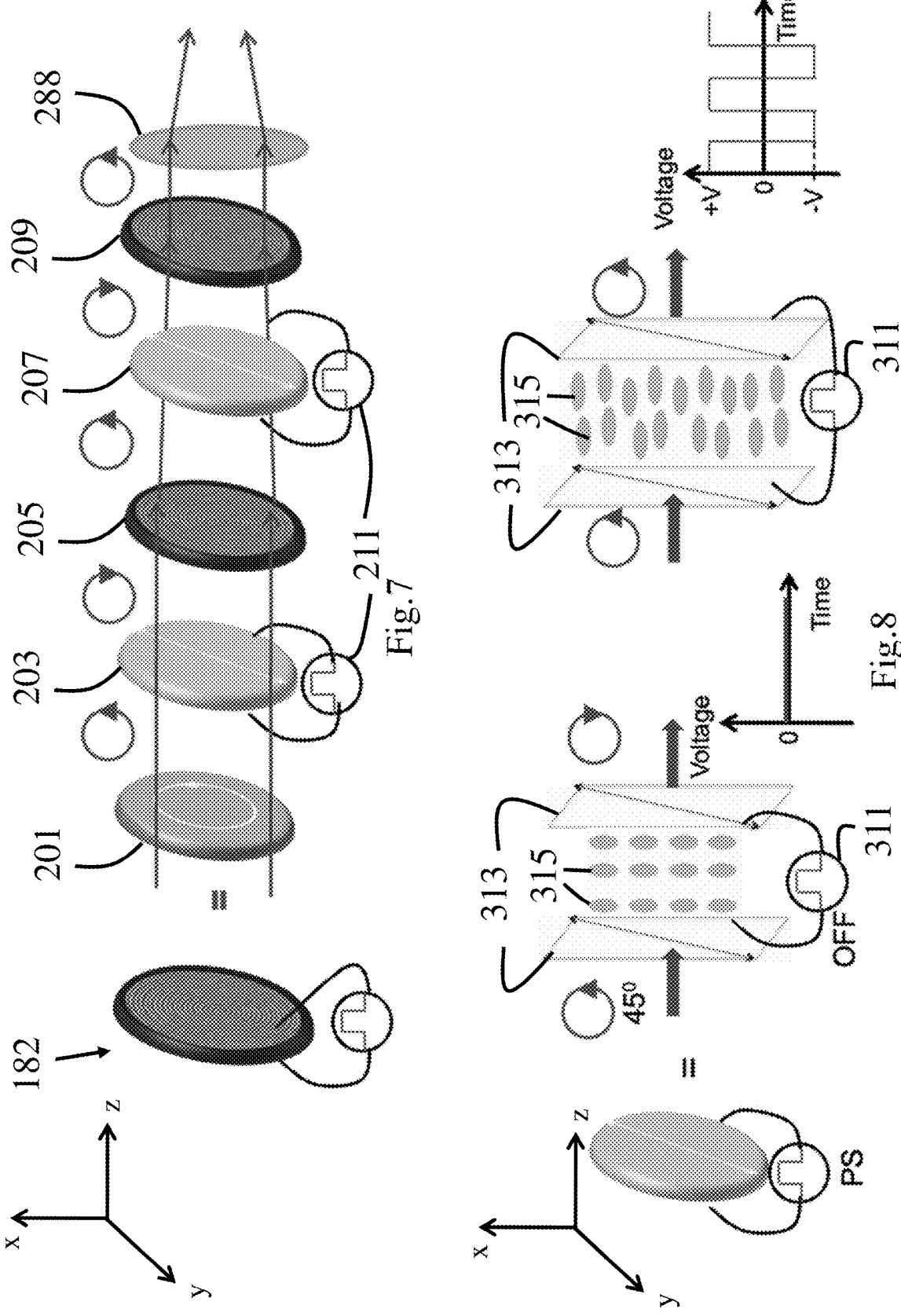
FIG. 7 shows the structure of the GPA module which contains polarization selectors, according to one embodiment.
FIG. 8 illustrates the structure and working principle of a polarization selector for use in GPA modules that is based on LC-HWP, according to one embodiment.

Next, FIG. 7 shows one possible implementation of the GPA module according to embodiments of the invention that can be used for example in the way as illustrated in FIGS. 6a-6b. The GPA module 282 in FIG. 7 is based on waveplate switching, and contains a circular polarizer 201, the first polarization selector (PS) 203, a first GPA 205, the second polarization selector 207, a second GPA 209, and a lens 288, all of which are sequentially arranged along the optical path, with the circular polarizer 201 at the frontmost position (i.e. closest to the environment that is to be captured). The second polarization selector 207 and the first polarization selector 203 could be the same or different, and each one of them is connected with a respective electronic driving circuitry 211 that is part of the control module for the optical module containing the GPA module 282. The circular polarizer 201 is a passive element which only allows circularly polarized incident light with particular handedness to pass through, so as to control the focusing ultimately captured by the DVS sensor. In other words, polarizations of the incident light at the circular polarizer 201 which do not have a predetermined handedness are filtered out. Both the second polarization selector 207 and the first polarization selector 203 are non-mechanical LC waveplates to control the polarization at respective GPAs 205, 207 placed immediately after the second polarization selector 207 and the first polarization selector 203. The focusing of static objects across each of the first GPA 205 and the second GPA 207 is unchanged when the voltages signal provided at the first polarization selector 203 and the second polarization selector 207 are both "low" i.e. in state S1 550 in FIG. 12a. The second polarization selector 207 and the first polarization selector 203 are independently controlled as they are fed with independent voltage signals.

The phase gradient of the first GPA 205 and the second GPA 207 are reversed to one another to ensure the focusing and hence FOV of the overall optical system is unchanged when control signals from the electronic driving circuitries 211 to both of the second polarization selector 207 and the first polarization selector 203 are in the 'low' voltage states, for example when the command signal to the control module from the action classification module is or remains inactive. When the polarization selectors 203, 207 are in state S1 550 depicted in FIG. 12a, and a 'low' voltage signals are applied across the first polarization selector 203 and the second polarization selector 207, where the first GPA 205 will converge the incoming beam while the second GPA 209 will diverge the receiving beam resulting in a negligible change in focusing from the GPA module 182. Conversely, when the polarization selectors 203, 207 are in state S2 555 in FIG. 12a, a 'low' voltage signal 'O' is applied at the first polarization selector 203 and while a 'high' voltage signal '1' is applied at the second polarization selector 207, in which the first GPA 205 and the second GPA 209 will both converge the receiving beam leading to an overall change in the focusing. During dynamic mode of operation, the GPA module 182 remain in state S1 550, and the focusing of the GPA module 182 is negligible where only dynamical object will be triggered. However, in the static mode operation, the state of the polarization selectors 203, 207 will interchange between S1 550 and S2 555, then the overall focusing as well as FOV of the environment 192b will be constantly changing that results in an intensity change which can be captured by the DVS sensor even if the object is static.

The first polarization selector 203 and the second polarization selector 207 can essentially be an electronic controlled birefringence liquid crystal half wave plate (LC-HWP) in FIG. 8. The polarization selector is a half-wave plate, comprising of two indium-tin-oxide (ITO) glass substrates 313 that is connected to positive and negative terminals of an electronic driving circuitry 311 with a layer 315 sandwiched in between. Each of the glass substrates in 313 comprise of an alignment layer controlling the LC layer orientated at 45 with respect to the xy plane in the reference frame. Depending on the potential difference between the positive terminal and the negative terminal, the molecular orientation for LC 315 located between two glass plates 313 will be tilted at a specific degree towards the normal direction of the glass substrates, modifying the polarization of the light to different extent. In particular, when the control signal from the electronic driving circuitry 311 is "off", the polarization selector behaves as a half wave plate such that the circular polarization state of the receiving light and the exiting light are reversed, as shown in the left-hand part of FIG. 8. When the control signal from the electronic driving circuitry 311 is "on", the polarization selector behaves as an isotropic optical element such that the polarization state of the receiving light and the exiting light are also reversed, as shown in the right-hand part of FIG. 8. To drive the polarization selector, the control signal is preferably a bipolar AC waveform as shown in FIG. 8 to ensure direct current balancing at the polarization selector to enhance the durability of the polarization controlled non-mechanical module.

Next, FIG. 9 illustrate another possible implementation of the polarization selector which is based on rapid Ferroelectric LC (FLC) waveplate switching. FLC is known to provide a much faster response time (up to 1000 times) compared to conventional LCs. In comparison with the polarization selector in FIG. 8, the FLC based polarization selector yields higher voltage dynamic range and frame rate for the static mode triggering of the DVS system owing to the rapid response time. However, voltage must be always supplied to the polarization selector in FIG. 9. The polarization selector in FIG. 9 contains two QWPs 413a, 413b with a FLC-HWP 415 sandwiched in between the two QWPs 413a, 413b. An electronic driving circuitry 411 is connected to the FLC-HWP 415. Depending on the polarity of the applied voltage, the FLC-HWP 415 exhibits in-plane switching with the optics axis 416 rotating from 0 degree (see the solid line arrow in FIG. 9) for negative applied voltage-V, and roughly 45 degrees (see the dashed line arrow in FIG. 9) for positive applied voltage V. The rotation occurs at the xy plane of the reference frame that is parallel to surface of the optical elements as to control the polarization state of the light at the GPA that is located immediately after the polarization selector. The orientation of the optics axis of the first QWP 413a that is located in front of the FLC-HWP 415 is configured to convert the circularly polarized incident light to an exiting light that is linearly polarized and is aligned along the x-direction in the reference frame. For the FLC-HWP 415, the orientation of the optics axis is configured such the exiting light is linearly polarized and is aligned along the x-direction in the reference frame at one switching polarity, while at the reverse polarity the exiting light is linearly polarized in the y-direction. Finally, the second QWP 413b convert the linearly polarized exiting light from the FLC-HWP 415 to circular polarized light, and depending on the driving voltage state at the FLC-HWP 415, the handedness of the circular polarized light exiting the FLC polarization selector will either be unchanged or reversed with respect to entering light at the selector.

Figures 11A, 11B:
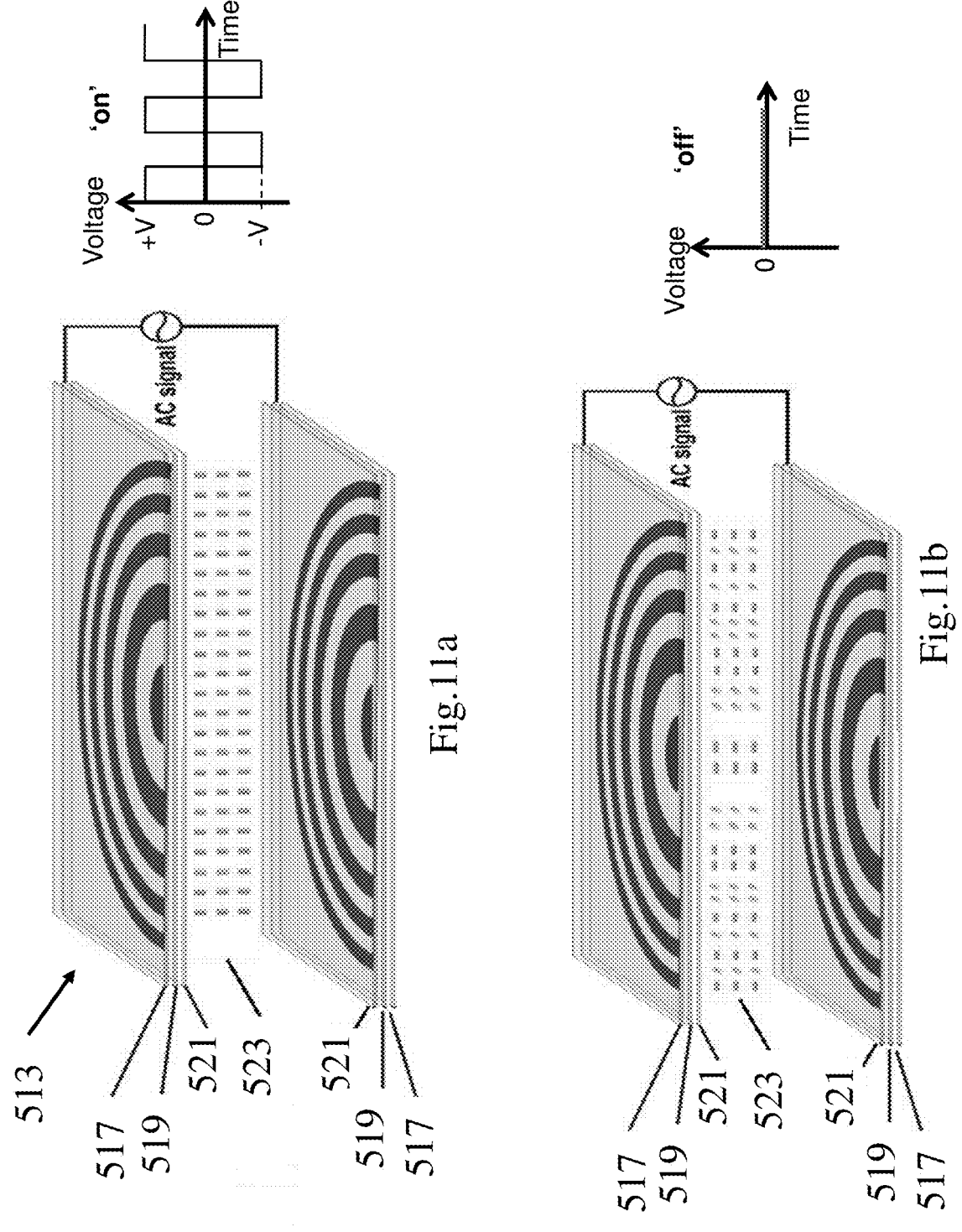
FIGS. 11a and 11b illustrate the structure and working principle of the active GPA module in FIG. 10, respectively in its activated state and deactivated state.

FIG. 10 illustrates another possible optical implementation of the static mode triggering based on AGPA. As shown in FIG. 10, such an electro-optical system includes a circular polarizer 501, a lens 588, the AGPA 515, and an electronic driving circuitry 511 connected to the AGPA 515. The circular polarizer 501, the AGPA 515, and the lens 588 are sequentially aligned on the optical path in the front-rear direction. The circular polarizer 501 enables polarization processing of the incident light for which the focusing can be modulated by the incoming signal from the electronic driving circuitry 511. The AGPA 515 is an electronic controlled birefringence LC-HWP with patterned LC alignment structure where the orientation angle of the LC molecule is linearly proportional to the radial distance from the centre of the element. As shown in FIGS. 11a and 11b, each of the glass substrate 517 of the AGPA 515 includes an ITO (Indium tin oxide) layer 519, and a coated photoalignment layer 521 (which is an UV photosensitive alignment layer) that are stacked together. A LC layer 523 is placed between the two glass plates 513. The diffraction effect of AGPA 515 can be made vanished under sufficient applied voltage by controlling the retardation of the component that is depicted in Eq. (1) with $\Gamma=0$.

Compared to the GPA modules in FIGS. 7-9 that are based on waveplate switching schemes, the AGPA switching scheme requires less components, yielding higher optical throughput. However, FLC cannot be used for AGPA, thus constraining the frame rate of the DVS system.

Figure 12B:
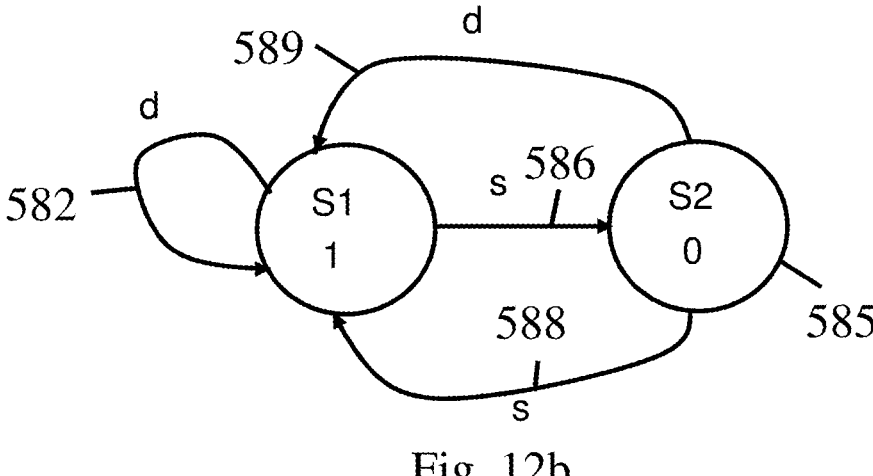
FIG. 12b is the finite state machine diagrams describing the state of the active GPA in FIG. 10 for the static mode triggering electro-optical module.

In terms of operation, when the command signal from the action classification module remains inactive (i.e. in dynamic mode where no object of interest is static), then this corresponds to a 'high' control driving voltage signal from the electronic driving circuitry 511 to the AGPA 515, where the diffraction of the AGPA 515 is suppressed and the dynamic vision sensing system remain focused. In other words, the focusing of the AGPA 515 is not normally 'off' when the AGPA 515 is not powered. Therefore, a 'high' applied voltage is required at the AGPA 515 during dynamic mode of operation to suppress the change in focusing from the GPA module 182 in FIG. 6a. Such operation is summarized in the finite state machine in FIG. 12b, where during the dynamic mode of operation, the AGPA 515 is in state S1 580 in FIG. 12b with a '1' indicating the voltage is applied across the AGPA 515, and the loop 'd' arrow 582 highlights that the AGPA 515 remains in state S1. Like the polarization selectors in FIG. 8, the control driving voltage signal for the AGPA 515 is preferably a bipolar AC waveform. In comparison, if the dynamic vision sensing system needs to be operated in the static capturing mode, then the common signal is active at the electronic control module 186 in FIG. 6a, and the control driving voltage signal from the electronic driving circuitry 511 to the AGPA 515 will be sequentially switched between the "low" voltage and "high" voltage states, resulting in a constant modulation in the high and low diffraction efficiency state of the AGPA 515 by regulating the retardation $\Gamma$ in Eq. (1). Therefore, the focusing of the GPA module 182 will be ON-OFF modulated in FIG. 6b establishing an intensity change at the DVS to capture object of interest even if it is static. The operation for static capturing mode using AGPA 515 is summarized in FIG. 12b where the state of the AGPA 515 will transit back ('s' arrow 588) and forth ('s' arrow 586) between state S1 580 and state S2 ('low' voltage state at AGPA signified by '0') 585 for each clock cycle, and as a result to facilitate intensity change even if the object of interest is static. Indeed, if the AGPA 515 satisfies the half-wave condition i.e. I(V)=n in Eq. (1), the 'low' control driving voltage 511 at the AGPA 515 corresponds to the applied voltage signal being 'off' i.e. V=0.

If the command signal from the action classification module remains active, then the focusing of the system is periodically changing as the AGPA 515 is continuously switched on and off.

Figure 13:
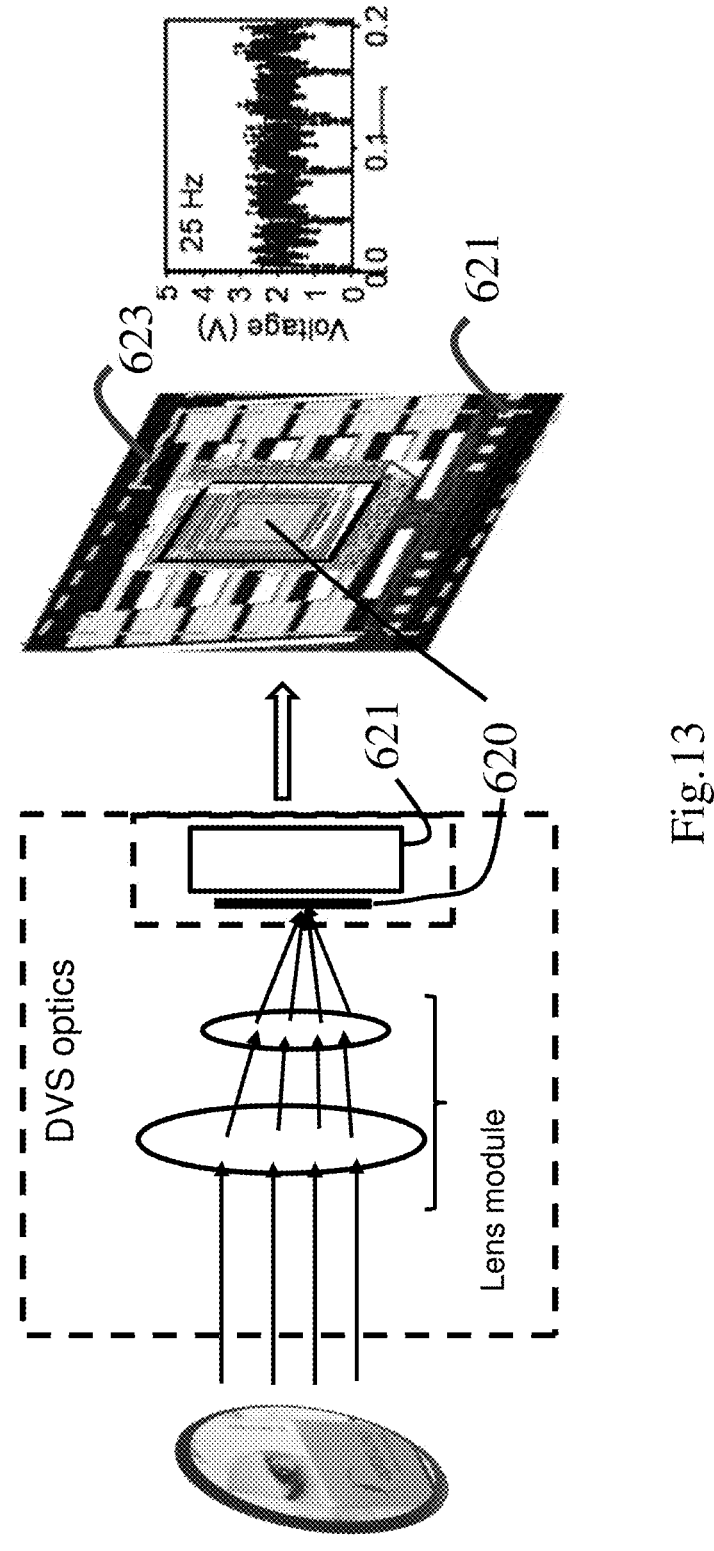
FIG. 13 shows the structure of a triggering optical module which contains MEMS (Microelectromechanical Systems) actuators, according to a further embodiment.

Besides various GPA modules mentioned above, the triggering optical module for using in the dynamic vision sensing system could be implemented using other mechanisms. FIG. 13 illustrates an electro-mechanical approach for triggering intensity changes in the static capturing mode which is based on MEMS actuators. The MEMS actuators as they are energized create relative motion between pixels of the dynamic vision sensor and the object. In particular, as shown in FIG. 13 the sensor 620 is placed on top of the MEMS 621 having multiple actuators 623. The actuators 623 are controlled individually by their respective driving voltages to create vibrations in two orthogonal directions to create a pixel shifting function as to induce an intensity change at the sensor 620 for static scenery.

In addition, the sensor 620 can also be vibrated by the MEMS actuators 623 to compensate for any external vibration noises subjected to the environment as to enhance the shock stability of the system. The MEMS actuators 623 in this way serve the function of vibrational noise cancellation.

Figure 14A:
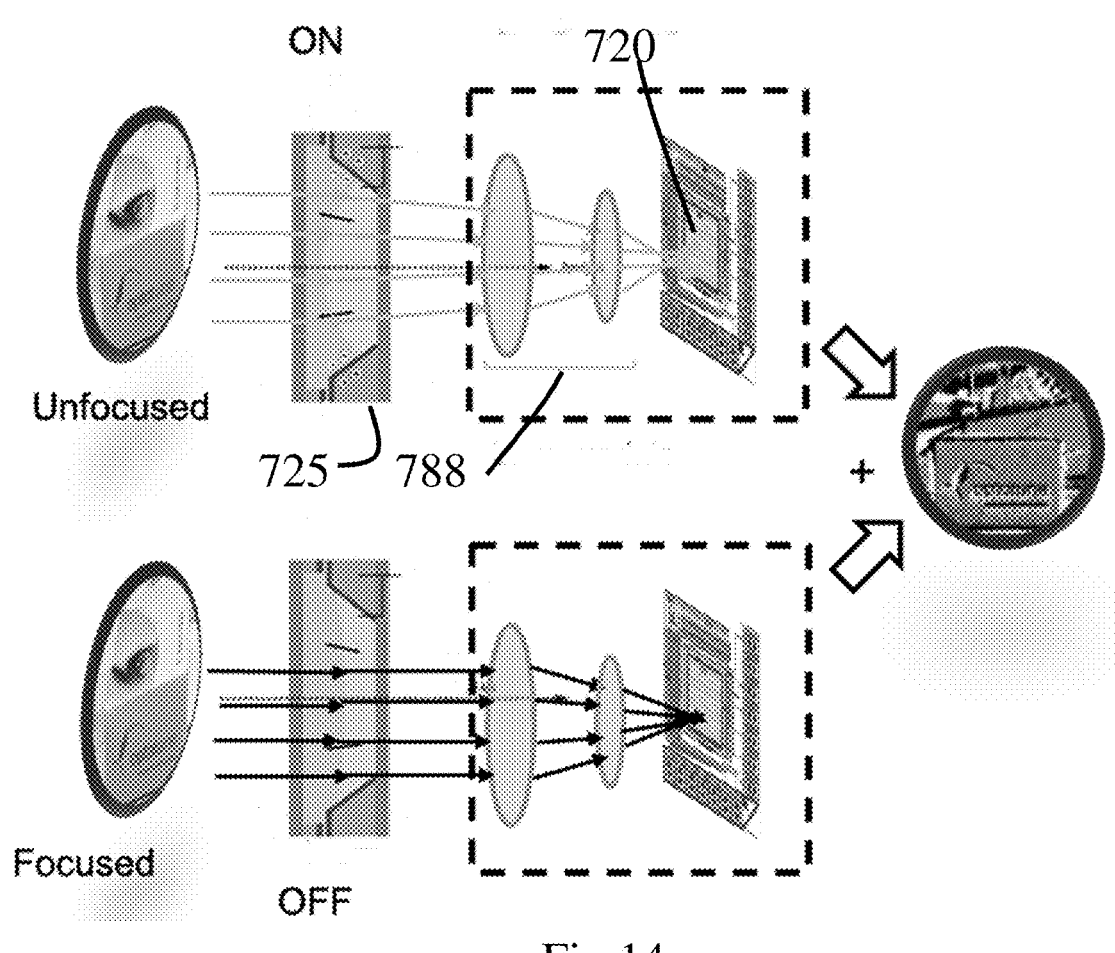
FIG. 14a shows the structure of a triggering optical module which contains a liquid lens, according to a further embodiment.
Figure 14B:
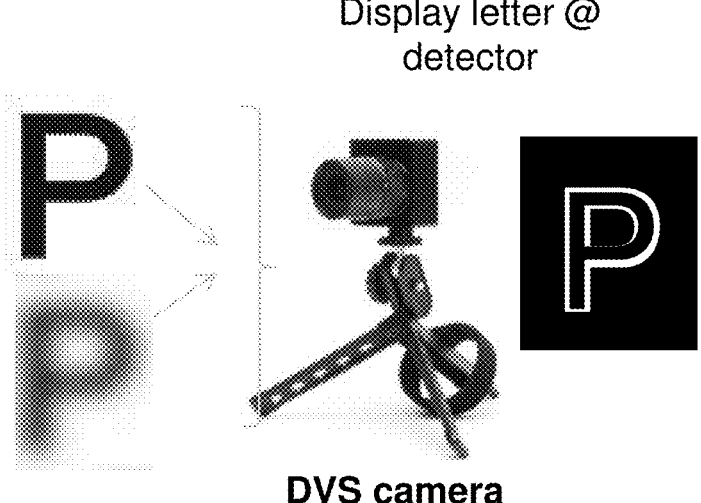
FIG. 14b illustrates the working principle of the triggering optical module in FIG. 14a to achieve intensity change of a captured static object.
Figure 14C:
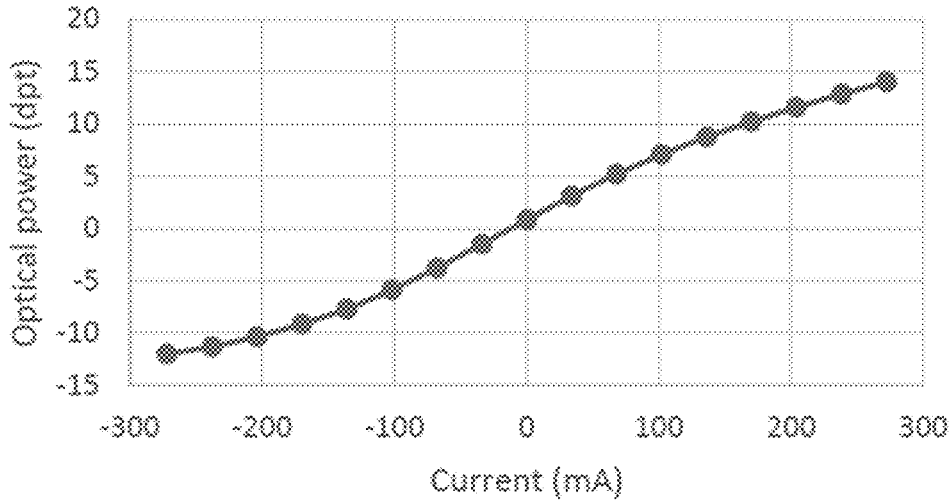
FIG. 14*c* illustrates a chart showing the optical power of the liquid lens in FIG. 14*a* as controlled by an applied current.
Figure 14D:
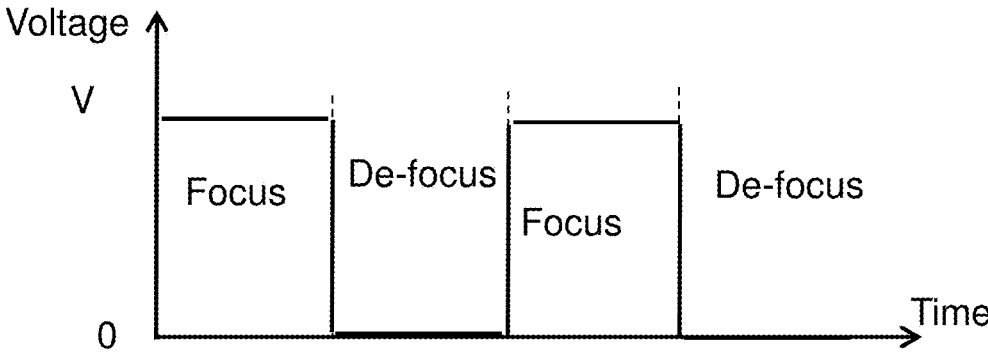
FIG. 14*d* illustrates a chart showing the focusing status the liquid lens in FIG. 14*a* as controlled by a voltage signal inputted to the liquid lens.

According to another embodiment of the invention, the triggering optical module for using in the dynamic vision sensing system could be implemented using liquid lens which provides periodic focusing and defocusing. As shown in FIG. 14a, the liquid lens electro-optical mechanical module contains a liquid lens 725 placed at a frontmost position before the lens module 788. The lens focusing power of the liquid lens 725 is changed periodically to establish a small shift in focusing as to induce an intensity change at the DVS sensor 720 behind the lens module 788 for static scenery. Through the repeated switching between defocusing and focusing, the intensity is changed on the object(s) in the captured data flow of the DVS sensor 720, in particular at the edges of objects and images. FIG. 14b shows an example using the letter "P", where the focused version and defocused version of the letter as they are combined to obtain a pixel shifting, which tracks the boundary of the letter and thus it is captured by the DVS sensor 720. FIG. 14c shows an example of the relationship of the magnitude of the input current to the liquid lens 725 and the change in the lens focusing power of the liquid lens 725. FIG. 14d shows an exemplary waveform of the voltage signal sent from the control module (not shown) to the liquid lens electro-optical mechanical module. As can be seen from FIG. 14d, when there is no voltage signal (i.e. it is "off") transmitted to the liquid lens electro-optical mechanical module, by default the liquid lens is defocused.

As can be seen, FOV of environment is captured by the DVS camera only when it is necessary and at predetermined condition, for example when an action of interest of an object of interest is identified by the object recognition module and action classification module. The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the embodiments described above, the focusing of an environmental scene inputted to the circular polarizer is mentioned which can be altered. Please note the focal length did not change when the optical response of the GPA is being modulated. The focal distance is still the same (i.e., it is still the sharpest at that focal distance) even if the state of the GPA changes. Accurately speaking, it is the 'point spread function' describing the intensity distribution of the focal spot that changes. The word "focusing" is used because the scene for which the object detection is performed is not a point, but is a made-up of infinitesimal number of tiny point spots with different intensity.

What is claimed is:

1. A dynamic vision sensing system, comprising:
   a) a dynamic vision sensor;
   b) an Artificial Intelligence (AI) recognition module connected to the dynamic vision sensor; and
   c) a static mode triggering module connected to the AI recognition module;
wherein the static mode triggering module is adapted to trigger an intensity change in an environment captured by the dynamic vision sensor to observe a static object; the AI recognition module upon detecting no change of a motion in the environment adapted to send a command to the static mode triggering module to trigger the intensity change.

2. The dynamic vision sensing system of claim 1, wherein the AI recognition module further comprises:
   d) an object detection module; and
   e) an action classification module connected to the object detection module;
wherein the object detection module is adapted to recognize an object of interest in the environment;
the action classification module adapted to detect a classified action from the detected object of interest.

3. The dynamic vision sensing system of claim 2, wherein the static mode triggering module is adapted to trigger the intensity change when a specific action is classified and the object of interest cannot be captured.

4. The dynamic vision sensing system of claim 2, wherein the object detection module is based on deep-learning and comprises:
   f) a bottleneck CSP (Cross Stage Partial) layer; and
   g) a long short-term memory added to the bottleneck CSP layer;

wherein the bottleneck CSP layer is adopted with added memory elements to obtain enhanced learning capability on spatiotemporal data.

5. The dynamic vision sensing system of claim 2, wherein the action classification module is adapted to receive an input data flow from the object detection module, perform temporal shifting to the input data flow, and classify an action of interest of the object of interest.

6. The dynamic vision sensing system of claim 2, wherein the AI recognition module is adapted to send the command to the static mode triggering module, if the object of interest disappears from the environment after the action of interest is detected by the action classification module.

7. The dynamic vision sensing system of claim 1, wherein the static mode triggering module further comprises:
   (h) an optical module located before the dynamic vision sensor on an optical path; and
   (i) a control module connected to the optical module;
wherein the control module is adapted to output a control signal to the optical module upon receiving the command from the AI recognition module, to trigger the intensity change.

8. The dynamic vision sensing system of claim 7, wherein the optical module is selected from the group consisting of a liquid lens electro-optical mechanical module, a micro-mechanical module, and a polarization controlled non-mechanical module.

9. A polarization-controlled optical module, comprising:
   a) a circular polarizer adapted to filter a polarization from an incoming light to the circular polarizer at a predetermined handedness;
   b) a GPA (Geometric Phase Axicon) module located after the circular polarizer on an optical path;
   wherein the GPA module is adapted to alter the focusing of an environmental scene inputted to the circular polarizer, as driven by a control signal.

10. The polarization-controlled optical module of claim 9, wherein the GPA module comprises:
   c) a first polarization selector;
   d) a first GPA;
   e) a second polarization selector; and
   f) a second GPA;
   wherein the first polarization selector, the first GPA, the second polarization selector and the second GPA are arranged on the optical path in sequence; the first polarization selector is adapted to control a handedness of filtered polarization by a first voltage signal, the second polarization selector adapted to control a handedness of output of the first GPA by a second voltage signal; the second voltage signal being independent from the first voltage signal.

11. The polarization-controlled optical module of claim 10, wherein the first voltage signal and the second voltage signal are configured to be reversed to each other, so that focusing of the environmental scene as outputted by the second GPA is altered.

12. The polarization-controlled optical module of claim 10, wherein each one of the first and second polarization selectors is an electronically controlled birefringence liquid crystal half wave plate (LC-HWP) that reverses a polarization state of a light received at the LC-HWP in the absence of applied voltage.

13. The polarization-controlled optical module of claim 10, wherein each one of the first and second polarization selectors comprises a ferroelectric liquid crystal half wave plate (FLC-HWP) sandwiched between two quarter wave-plates (QWP); the FLC-HWP connected to an electronic driving circuitry.

14. The polarization-controlled optical module of claim 13, wherein an optics axis of the FLC-HWP effectively rotates in a surface plane of the said FLC-HWP at a specific direction when an applied voltage changes from a negative voltage to a positive voltage by the electronic driving circuitry, or vice versa.

15. The polarization-controlled optical module of claim 9, wherein the GPA module comprises an active geometric phase axicon (AGPA); the AGPA adapted to control focusing of the environmental scene as driven by a control signal.

16. The polarization-controlled optical module of claim 9, wherein the GPA module is configured to periodically change the focusing of the environmental scene so as to trigger an intensity change of a static object in the environmental scene.

17. A method of capturing a static object using a dynamic vision sensor, comprising the steps of:
   a) triggering, by an optical module which is electronically controllable, an intensity change in an environment captured by the dynamic vision sensor, wherein, upon detecting no change of motion in the environment, an Artificial Intelligence (AI) recognition module connected to the dynamic vision sensor sends a command to the optical module, and the optical module triggers the intensity change in response to the command; and
   b) observing the static object in the environment by the dynamic vision sensor.

18. The method of claim 17, further comprises, before Steps a) and b), the steps of:
   c) detecting and recognizing an object of interest in the environment; and
   d) detecting, using an action classification module, an action of interest.

19. The method of claim 18, wherein Step b) further comprises the step of:
   e) receiving an input data flow outputted by Step a);
   f) extracting features from the input data flow using a Convolutional Neural Network (CNN);
   g) performing a temporal shifting to the features; and
   h) classifying the action of interest of the object of interest.

20. The method of claim 17, wherein Step a) further comprises:
   i) polarizing an ambient light in an environmental scene from the environment captured by the dynamic vision sensor; and
   j) using a GPA (Geometric Phase Axicon) module as the optical module to alter focusing of the environmental scene, so as to observe the static object.

* * * * *